June 8, 1926.
E. V. LAWRENCE
1,588,035
DRAFT GEAR
Filed June 11, 1919      2 Sheets-Sheet 1
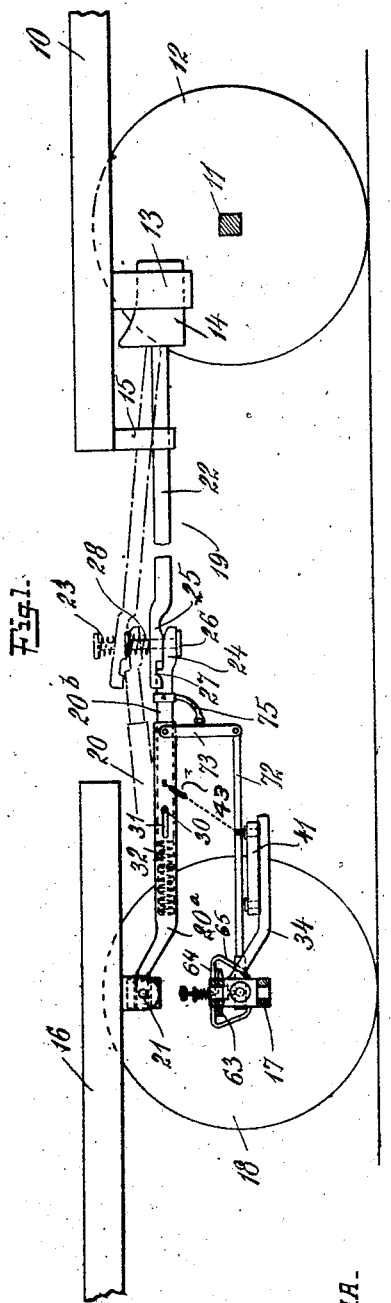
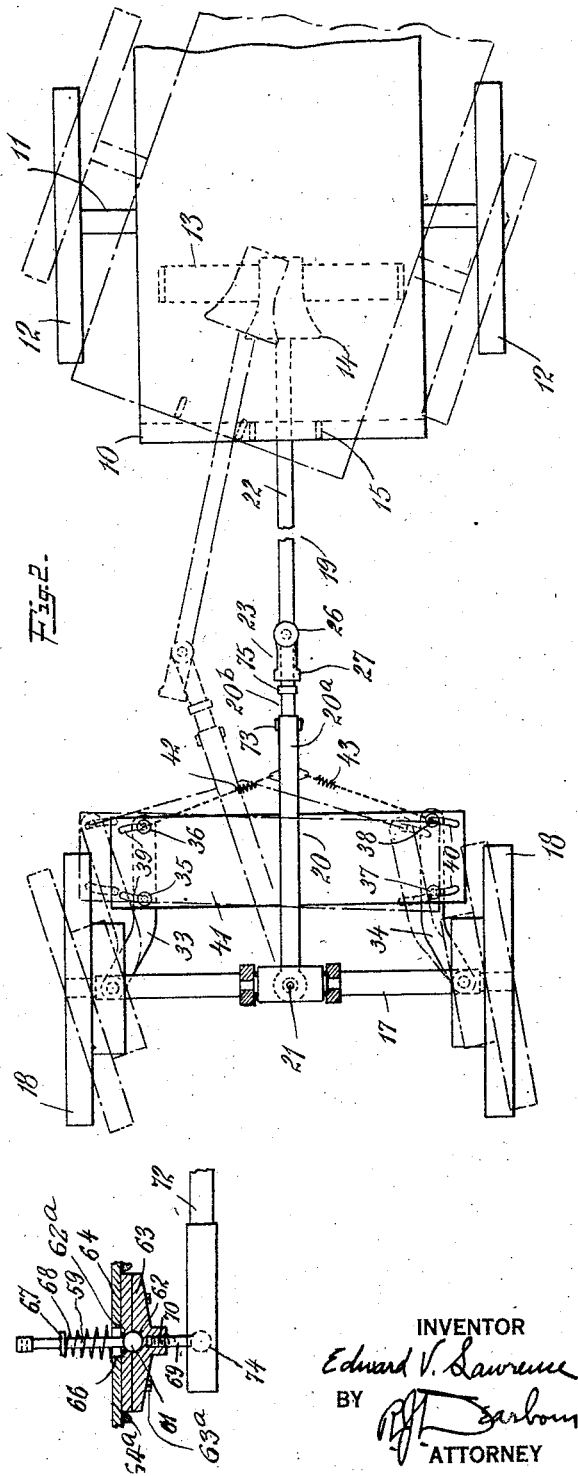
INVENTOR
Edward V. Lawrence
BY
ATTORNEY June 8, 1926.

E. V. LAWRENCE

DRAFT GEAR

Filed June 11, 1919    2 Sheets-Sheet 2

1,588,035

INVENTOR
Edward V. Lawrence
BY
ATTORNEY

Patented June 8, 1926.

1,588,035

UNITED STATES PATENT OFFICE.

EDWARD V. LAWRENCE, OF ENGLEWOOD, NEW JERSEY, ASSIGNOR TO E. V. LAWRENCE SAFETY BRAKE COMPANY, INC., A CORPORATION OF NEW YORK.

DRAFT GEAR.

Application filed June 11, 1919. Serial No. 308,433.

My invention relates to trailers and draft gear mechanisms for use in connection therewith. It has special reference to trailers which are adapted to be connected to and drawn by motor vehicles, and my invention is particularly concerned with the draft gear mechanism or the connection between the power vehicle and the trailer.

One object of my invention is to provide a draft gear mechanism of the character above indicated that shall be relatively simple in construction and operate in such manner as to curtail and minimize the side sway and other undesirable movements of the trailer relative to the truck.

There are several factors which have rendered draft gear mechanisms, which have hitherto been available for the above named purpose, relatively objectionable and which have materially interfered with the successful trailer and have permitted if not encouraged considerable side sway of the trailer relative to the truck and thereby increased the difficulties and dangers of trailer operation, namely:—

1. The connection between the draft gear and the power vehicle or tractor has usually been established at the rear end of the body or frame materially above the line of the axle and at a considerable distance behind the vertical plane of the axle. For this reason the point of connection is subject to a considerable amplified movement when the vehicle turns corners or makes other curves, or due to any inequalities of the road surface, the frame acting like a lever arm of considerable length with its pivot at the centre of the rear axle. In some instances the action is even further exaggerated, the point of pivot being the centre of the front axle and the back wheels the point of application of the moving force, as for example when the hind wheels of the tractor vehicle skid or move up and down due to the contour of the road bed, and it is furthermore exaggerated by the springs.

2. The point of connection between the draft gear and the trailer has usually been at a considerable height above the trailer axle and at a still further height, of course, above the ground, so that any side movement of the tractor tends to produce an exaggerated movement of the trailer.

3. The length of the draft gear connection has usually been short and consequently the trailer is sensitive to and easily and adversely influenced by the movement of the tractor.

According to my invention I avoid to a considerable extent the aforesaid disadvantage by providing a relatively long draft gear mechanism, which under normal side sway operating conditions, acts like a rigid bar and which nevertheless is arranged to automatically break a joint at an intermediate point in its length whenever the tractor and trailer swing around a curve of predetermined radius, the arrangement being such that for large radius curves, such as are negotiated in operating on ordinary roads without making a turn, the connection remains rigid and acts as a unit while in making a relatively short turn the joint will be brought into action.

The relatively long draft gear of my invention is preferably secured to the power vehicle or tractor at a point near the rear axle and as low as possible without reducing the clearance of the vehicle. Furthermore the draft gear mechanism is preferably connected at the trailer end, close to the trailer axle which is as near the ground as possible.

The details of the connection between the sections of the draw bar will be brought out hereinafter and it may be generally stated that the joint is so arranged as to interlock, and give the effect of a continuous rigid bar in a horizontal or substantially horizontal plane and is arranged to be released when the tractor section of the bar is raised, which is accomplished automatically by means of a suitable cam mechanism, when the draw bar swings a certain number of angular degrees to one side or the other by the turning of the vehicle. This cam mechanism, while shown as applied to the tractor section of the draw bar, may, of course, be applied to the trailer section if desired.

A further object of my invention is to provide a particularly desirable and effective mechanism for steering the trailer in response to the turning of the tractor.

Other objects and advantages of my invention will be set forth hereinafter and I will now describe the same with reference to the drawings and point out the novel features thereof in the appended claims.

Referring to the drawings:—

Figure 1 is a partially diagrammatic elevation showing the rear end of a tractor and the front end of a trailer which are interconnected by draft and steering gear mechanisms arranged and constructed in accordance with my invention.

Figure 2 is a plan view of the apparatus shown in Figure 1 with certain parts broken away and shown in section.

Figure 2ª is an enlarged detail view of a portion of the brake actuating mechanism.

Figure 3:
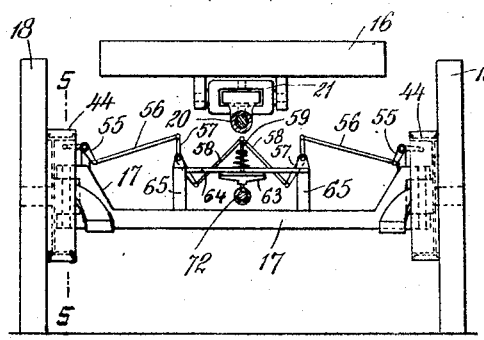
Figure 4:
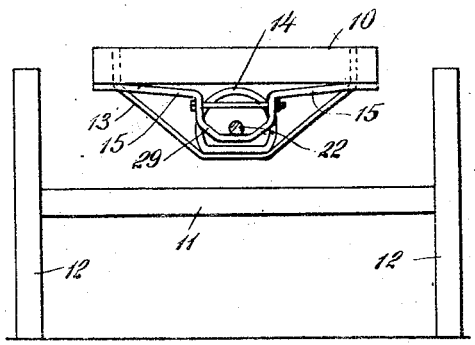

Figure 3 is a front elevation of the trailer of the previous figures and Figure 4 is a rear elevation of the tractor.

Figure 5:
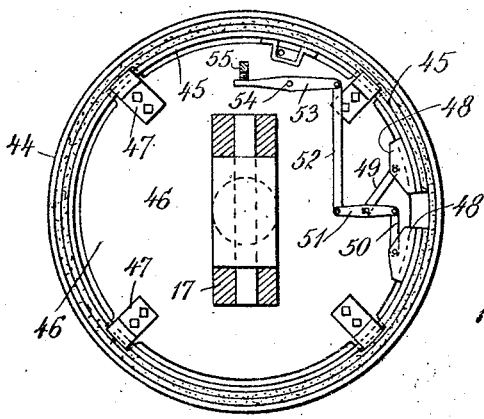

Figure 5 is a sectional detail on the line 5—5 of Figure 3 drawn to a larger scale and showing the brake actuating mechanism.

Figure 6:
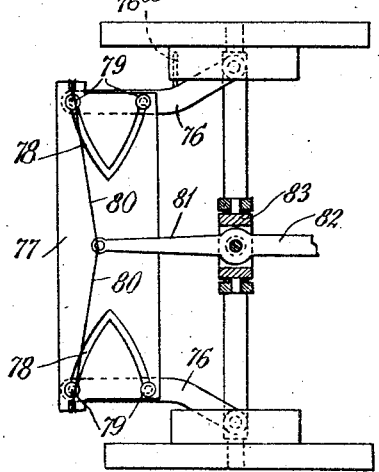

A modified steering mechanism, which also embodies my invention, is shown in Figure 6.

Figure 7:
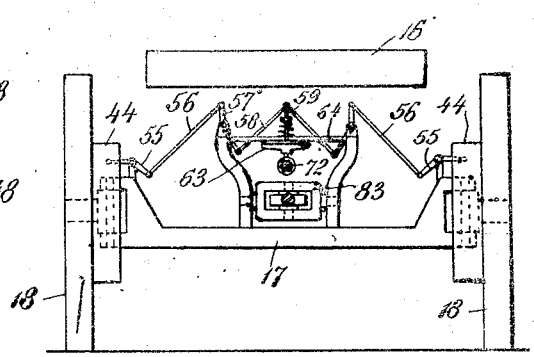

Figure 7 is a view corresponding to Figure 3 of a modified arrangement of the brake actuating mechanism, showing the draw bar connected to the trailer at a point near the axle.

Figure 8:
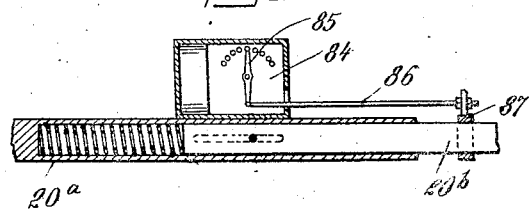

Figure 8 is a modified draw bar equipped with an automatic control adapted to be used with electrically governed or actuated brakes.

Figure 9:
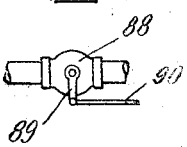

Figure 9 is a slight modification of Figure 8 showing a draw bar actuated control for governing either pneumatic or hydraulic brakes or brake mechanisms.

Having special reference to Figures 1 to 5 inclusive, 10 designates a chassis of a truck or other tractor having a rear axle 11, and wheels 12. The frame 13 is secured to the chassis preferably at a considerable distance ahead of the rear end of the vehicle, and mounted thereon is a coupling socket 14. A cam bracket 15 is spaced from the coupling socket toward the rear of the chassis and may be located at the rear end of the tractor.

16 designates the chassis of a trailer having an axle 17 with steered wheels 18 associated therewith in the usual manner. A draw bar 19 comprises a spring-connected telescoping section 20 universally connected at 21 to the chassis 16, and a rigid section 22 which is removably pinned or otherwise connected to the coupling socket 14. The draw bar may be and preferably will be connected to the trailer at the axle or a point near the axle and I have shown a modified arrangement in Figure 7 which may be considered preferable in some cases.

The draw bar sections 20 and 22 are connected by a special joint 23 which is arranged in such manner that, when the parts are in substantial alignment, they act like a rigid member and when one of the sections is elevated by reason of the action of the cam bracket, as more fully explained hereinafter, the joint is broken, permitting the parts to toggle and occupy the position shown in dotted lines in Figures 1 and 2.

The joint 23 comprises a pair of cooperating lugs 24 and 25 at the ends of the respective members, through which a pin 26 extends. The lug 25 has a forked extension 27 which is adapted to overlap and grip the adjacent portion of the draw bar section 20. The pin 26 extends considerably beyond the member 25 and is provided with a spring 28 which presses the lugs together. The arrangement of parts is such that in a vertical plane the joint is slightly overset and consequently compressive forces do not tend to lift the sections or break the joint. Any other suitable means for maintaining the desired arrangement may be utilized instead of the spring.

The cam bracket 15 is clearly shown in Figure 4 and is formed with a central depression 29 which is sufficiently wide to permit the necessary swinging of the draw bar sections when the tractor and trailer are rounding a curve or making a turn.

The sides of the depression are inclined or curved downwardly toward the bottom so that they act as cam surfaces and elevate the draw bar section 22 when it moves to any considerable extent on either side of the center. I prefer to allow for a small lateral movement in either direction before the cam surfaces come into action.

The draw bar section may be made in two parts designated respectively 20ª and 20ᵇ, 20ª being hollow or tubular and providing a socket into which 20ᵇ extends. The parts telescope and the relative movement is limited by pin 30 in slot 31, the spring 32 being within the pivoted section 20ª and connected to both members so that it may act in tension and reduce the shocks at starting. The spring construction may be modified in various ways within the spirit and scope of my invention and the spring may be omitted entirely if desired.

As above indicated the wheels 18 are mounted on steering knuckles in the usual way and the steering arms 33 and 34, in the Figure 2 construction, extend forwardly and are provided with correspondingly located spaced pins 35, 36, 37 and 38. These pins extend through curved slots 39 and 40 located near the respective ends of a distance piece or spacer 41. The arms are connected near their outer ends, the connection being established from the pins 36 and 38, by springs 42 and 43 or some other suitable means, to the draw bar section 20ª.

The steering arms constitute a suitable means for carrying brake bands or at least carrying a stop for limiting the rotative movement of the bands as hereinafter explained.

Each is provided with a brake drum 44 which in the arrangement shown is internally acted upon by a brake band or ring 45. The brake band is mounted on a disc 46 having supporting lugs 47 which do not interfere with a limited rotative movement of the band. These lugs are bolted in place and by removing one bolt may be swung radially inward to permit the ready replacement of the brake band. The brake band has lugs 48 at its respective ends to which actuating links 49 and 50 are connected. The links are connected at their opposite ends to a toggle lever 51, one being connected to an intermediate point in the toggle lever and the other to one end of the toggle lever. The opposite end of the toggle lever is connected by a link 52 to an actuating lever 53 which is pivotally mounted on the disc 46 at 54 and extends at one end into the path of movement of a primary actuating bell crank lever 55 which is mounted on the axle 17. The point of contact between the levers 55 and 53 is in alignment with the steering axis of the wheel and consequently the braking action is transmitted irrespective of the angle to which the wheels are turned. The brake arrangement is duplicated for the other wheel and the two levers 55 are interconnected by links 56, bell crank levers 57 and links 58 which are joined together over the center of the axle and to a vertically acting rod 59.

The structure at this point is shown in detail in Figure 2ª, to which special reference may now be had. As here shown the rod 59 is enlarged forming a ball 61 at its lower end, which is set into a socket 62 formed in a universal bell crank member 63 preferably of circular form. The socket 62 is cut away at 62ª to provide clearance. The member 63 is conveniently composed of two parts that are rigidly secured together by bolts 63ª or other suitable means. A horizontal supporting plate 64 is mounted on the axle 17 by spaced brackets 65 and is perforated at 66 to form an opening through which the rod 59 extends. The bell crank member 63 is seated in an annular abutment 64ª which is suitably fastened to the underside of the supporting plate 64. The rod is enlarged at 67 to form a shoulder and a spring 68 is interposed between the shoulder thus formed and the plate 64 in such manner as to elevate the rod and hold the bell crank member 63 against the underside of the plate 64.

A bolt or adjustable extension 69 extends downwardly from the bell crank member 63 in substantial alignment with the rod 59, being screwed into a tapped hole 70 in said member. A brake actuating rod 72 is suspended at one end by a link 73 from the draw bar member section 20ª and extends substantially parallel to the draw bar, being connected at its opposite end by a universal joint or some other suitable connection 74 to the lower end of the extension 69.

Affixed to the draw bar section 20ᵇ is an actuating member 75 which is adapted to engage the link 73 and push it backwardly when the draw bar sections 20ª and 20ᵇ are forced together by the pushing of the trailer against the tractor as hereinafter explained. This action causes the link to swing and to force the bar 72 backwardly which in turn rocks the bell crank member 63 which is restrained against sliding movements by the ring abutment 64ª. This rocking movement will take place in the same manner and to substantially the same extent and effect substantially the same result irrespective of the angle to which the wheels may be turned, the angle of brake application being thus immaterial.

The bell crank member 63 when thus rocked turns about a pivot at its edge and pulls downwardly on the rod 59 thus compressing the light spring 68. This downward pull actuates the brakes through the mechanism above described and in the manner more fully pointed out hereinafter.

As soon as the pressure on the rod 72 is released the universal bell crank member 63 is reseated by the spring 68.

Referring to Figure 6 the steering mechanism may be modified to accommodate rearwardly extending steering arms such as 76, the spacer or distance piece 77 being substituted for the member 41 of Figure 2 and being provided with slots 78 which are of suitable shape to permit the steering of the wheels when engaged by pins or projections 79 of the arms. The steering arms are connected, by springs or other connections indicated at 80, to an extension 81 of the draw bar section 82 which corresponds to the section 20ª.

In this arrangement the draw bar section instead of being connected to the chassis 16 of the trailer is connected to the axle by a gimbal or other suitable universal joint indicated at 83. In this arrangement the brake actuating bar instead of being below the draw bar is above it as clearly indicated in Figure 7, like parts being designated by the same reference character as in the previous figures.

The operation of the mechanism is as follows:—

Assuming that the tractor 10 is drawing the trailer up hill or on a level road, or under any conditions, such that the draw bar is under tension, the brakes are released and the draw bar sections occupy the position shown in full lines in Figures 1 and 2. If the tractor and trailer start down grade, or, if the tractor slows up so that the trailer attempts to push against the tractor the draw bar section 20ᵇ is pushed inwardly into the section 20ª with which it telescopes, compresses the spring 32 and, through the action of the member 75, actuates the link 73 and produces a backward push on the rod 72. This rod, as already explained in connection with the description of the brake per se, serves to rock the bell crank member 63 about its edge, producing a pull on the rod 59 and thus setting the brakes on the trailer. An adjustable stop 76ᵃ projecting from the steering arm 76 into the brake drum on the right, or upper side as viewed in the figure, serves to limit the travel of the brake equalizer at will.

The application of the brake is dependent upon and determined by the force with which the trailer tends to push against the tractor. This is as it should be and the trailer is in consequence governed in response to the action of the tractor which is of course directly responsive to the driver. In other words, when the driver of the tractor sets his brakes, the brakes on the trailer are automatically set to the extent necessary to hold back the trailer under the existing conditions.

The draw bar under the conditions just described, acts as a unit and its length and its point of connection with the tractor and trailer are such as to produce a particularly steady and uniform action of the trailer and such as to prevent whipping or side swaying of the trailer relative to the tractor. The same conditions exist for curves of long radius such as are encountered in an ordinary road, but conditions are different when a sharp curve or turn is negotiated.

Assuming that the tractor is turned, as shown in broken lines in Figure 2, the draw bar section 22 is forced to one side of the center and rides up one of the cam surfaces of the cam bracket 15 (this camming action is purposely arranged so as to not affect the draw bar for large radius turns) so as to raise the section into the broken line position of Figure 1 and permit the joint to break, allowing the parts to knuckle as shown in broken lines in Figure 2. By this means I secure the advantages of the long rigid draw bar for straight-away operation without preventing sharp turns. Furthermore, the arrangement is such that the trailer will track the tractor, avoiding the possibility of cutting corners.

If, when the draw bar sections are at an angle as shown in broken lines in Figures 1 and 2 the trailer tends to push against the tractor, the reaction through the draw bar section 20ᵇ is transmitted to actuate the brake the same as above described for the straight-away operation, attention being particularly directed to the fact that both draw bar section 20ᵃ and the brake actuating rod 72 are universally connected to the vehicle in preferably vertical alignment. In using the term "universal joint" I do not intend to limit myself to any particular form, any joint being suitable which permits sufficient lateral and vertical movement of the draw bar sections to facilitate the coupling and uncoupling of the trailer as well as the essential movement for turning corners.

It is evident that while in the arrangement shown in Figures 1 to 7 inclusive, the action of the brake is directly dependent on the reaction of the draw bar in opposition to the tendency of the trailer to overhaul the tractor; the reactionary forces may be utilized merely to control the brake application which may be effected in other ways as, for example, electrically or pneumatically.

Figure 8 shows the draw bar sections telescoping as before, with a rheostatic controller 84 having an arm 85 which is connected by a rod or link 86, and a lug 87 clamped or otherwise secured to the section 20ᵇ. Arrangement of parts is such that the reactionary movement causing the draw bar section 20ᵇ to telescope, swings the arm 85 so as to introduce to a greater or less degree electrical energy for applying the brakes in some suitable manner. I have not shown the magnets or motors for effecting the brake application as their form is immaterial to my invention, the regulation of the force of application dependent on the extent of the overhauling tendency or pushing force exerted by the trailer being germane to my invention. Instead of the rheostatic controller 84 any suitable controlling device may be utilized.

Figure 9 shows a control valve 88 provided with an actuating arm or stem 89 instead of the rheostatic controller 84, the valve being connected by a rod 90 to be actuated in response to the telescoping movement of the draw bar.

The valve may of course control the source of fluid pressure for the application of the pneumatic brakes or the supply of any suitable fluid or liquid.

Attention is particularly directed to one important feature of my invention, viz, the shock absorbing effect of the brakes. It is evident that the automatic application of brakes on the trailer to a varying degree depending on the existing conditions, serve to absorb and prevent shocks between the tractor and the trailer and not only prevents or minimizes the hammering or pounding of the parts, but also renders the use of spring shock absorbers unnecessary. The spring 32 illustrated between the parts of the draw bar is not a shock absorbing spring in the usual sense, it not being relied upon to take the shocks of the vehicle. It is merely to maintain the proper relation between the parts when released and may be omitted if desired.

It may however be desirable to arrange it to act in tension as already pointed out, to tend to pull the telescoping parts together and thus to lessen the shocks at starting or when there is a sudden increase in speed of the tractor which makes it tend to pull away from the trailer. All shocks which would otherwise occur due to the overhauling of the tractor by the trailer are absorbed in the brakes.

Various structural modifications may be effected within the spirit and scope of my invention and I intend that only such limitations be imposed as are indicated in the appended claims.

What I claim is:—

1. In a tractor and trailer the combination with a draw bar comprising jointed sections normally in rigid relation but adapted to knuckle when the vehicle members are rounding a curve of relatively short radius, of a brake actuating mechanism adapted to respond to a compressive action in the draw bar irrespective of the angularity between the parts of the draw bar.

2. The combination with a tractor, of a trailer having brakes and a jointed draw bar connection between the tractor and the trailer that is normally interlocked and is adapted to be unlocked upon lateral movement of the trailer relative to the tractor whereby the side swaying of the trailer is opposed and minimized.

3. The combination with a tractor, of a trailer having brakes and a jointed draw bar connection between the tractor and the trailer, that is normally interlocked and is operatively connected to actuate the brakes and arranged to be unlocked under predetermined conditions to prevent side swaying of the trailer.

4. The combination with a tractor, of a trailer having brakes, and a jointed draw bar connection between the tractor and the trailer, that is normally interlocked and is operatively connected to actuate the brakes and arranged to be automatically unlocked to act in conjunction therewith to prevent side swaying of the trailer.

5. The combination with a tractor and a trailer having brakes, of an elongated draw bar between said tractor and said trailer comprising a plurality of pivotally connected sections, means for interlocking said sections under normal operating conditions, means adapted to cooperatively engage one of said sections under predetermined conditions to unlock said draw bar sections and allow them to knuckle, and means associated with said draw bar for automatically setting the brakes when the trailer tends to overrun the tractor, irrespective of whether the draw bar sections are interlocked or unlocked and knuckled.

In witness whereof I have hereunto set my hand this 28th day of May, 1919.

E. V. LAWRENCE.